United States Patent
Seibold et al.

(10) Patent No.: US 8,840,187 B2
(45) Date of Patent: Sep. 23, 2014

(54) PIVOT RETAINER

(75) Inventors: Kurt A. Seibold, Whitmore Lake, MI (US); Yogesh A. Pawar, Farmington Hills, MI (US); Ioan N. Ghergheli, Westland, MI (US)

(73) Assignee: Johnson Controls Technology Company, Holland, MI (US)

( * ) Notice: Subject to any disclaimer, the term of this patent is extended or adjusted under 35 U.S.C. 154(b) by 905 days.

(21) Appl. No.: 12/526,368

(22) PCT Filed: Feb. 8, 2008

(86) PCT No.: PCT/US2008/053474
§ 371 (c)(1),
(2), (4) Date: Dec. 2, 2010

(87) PCT Pub. No.: WO2008/098200
PCT Pub. Date: Aug. 14, 2008

(65) Prior Publication Data
US 2011/0062761 A1    Mar. 17, 2011

Related U.S. Application Data

(60) Provisional application No. 60/900,469, filed on Feb. 8, 2007.

(51) Int. Cl.
*B60N 2/14*    (2006.01)
(52) U.S. Cl.
USPC ........................................ 297/336; 297/378.1
(58) Field of Classification Search
USPC .......................... 297/336, 326, 378.1, 344.15; 296/65.03, 65.09
See application file for complete search history.

(56) References Cited

U.S. PATENT DOCUMENTS

| | | | |
|---|---|---|---|
| 5,383,699 A * | 1/1995 | Woziekonski et al. | .... 296/65.09 |
| 6,065,804 A | 5/2000 | Tanaka et al. | |
| 6,135,555 A | 10/2000 | Liu et al. | |
| 6,183,032 B1 * | 2/2001 | Champ | ...... 296/65.03 |
| 6,565,112 B2 * | 5/2003 | Hanson et al. | ................ 280/650 |
| 6,830,295 B2 * | 12/2004 | Duquesnay et al. | .......... 297/336 |
| 6,863,330 B2 | 3/2005 | Yokoyama et al. | |

(Continued)

FOREIGN PATENT DOCUMENTS

JP    2004-58830    2/2004

OTHER PUBLICATIONS

Patent Treaty Cooperation, Written Opinion of the International Searching Authority and International Search Report, PCT/US08/53474, Jul. 30, 2008.

(Continued)

*Primary Examiner* — David R Dunn
*Assistant Examiner* — Timothy J Brindley
(74) *Attorney, Agent, or Firm* — Butzel Long

(57) ABSTRACT

A reconfigurable seat assembly (4) that provides a vehicle seat with greater flexibility and adjustability. The seat assembly (4) includes a latch mechanism (10) that enables the seat assembly (4) to be positioned into design, fold, stow or tumble configurations or a combination thereof. The latch mechanism (10) includes a first link member (12), a second link member (20), and a base member (34). The first link member (12) is pivotally coupled to both the seat base (8) and to the second link member (20). The second link member is pivotally coupled to both the first link member (12) and to the base member (34). The base member (34) is fixed to a portion of a vehicle (2) structure.

5 Claims, 12 Drawing Sheets

(56) References Cited

U.S. PATENT DOCUMENTS

| | | | |
|---|---|---|---|
| 6,902,236 B2 * | 6/2005 | Tame | 297/335 |
| 6,974,173 B2 | 12/2005 | Yokoyama et al. | |
| 7,758,123 B2 * | 7/2010 | Picker et al. | 297/336 |
| 8,251,450 B2 * | 8/2012 | Carroll et al. | 297/334 |
| 2004/0104589 A1 | 6/2004 | Yokoyama et al. | |

OTHER PUBLICATIONS

Translation of "Notice of Reasons for Rejection", (Office Action), date of delivery Dec. 3, 2013.

* cited by examiner

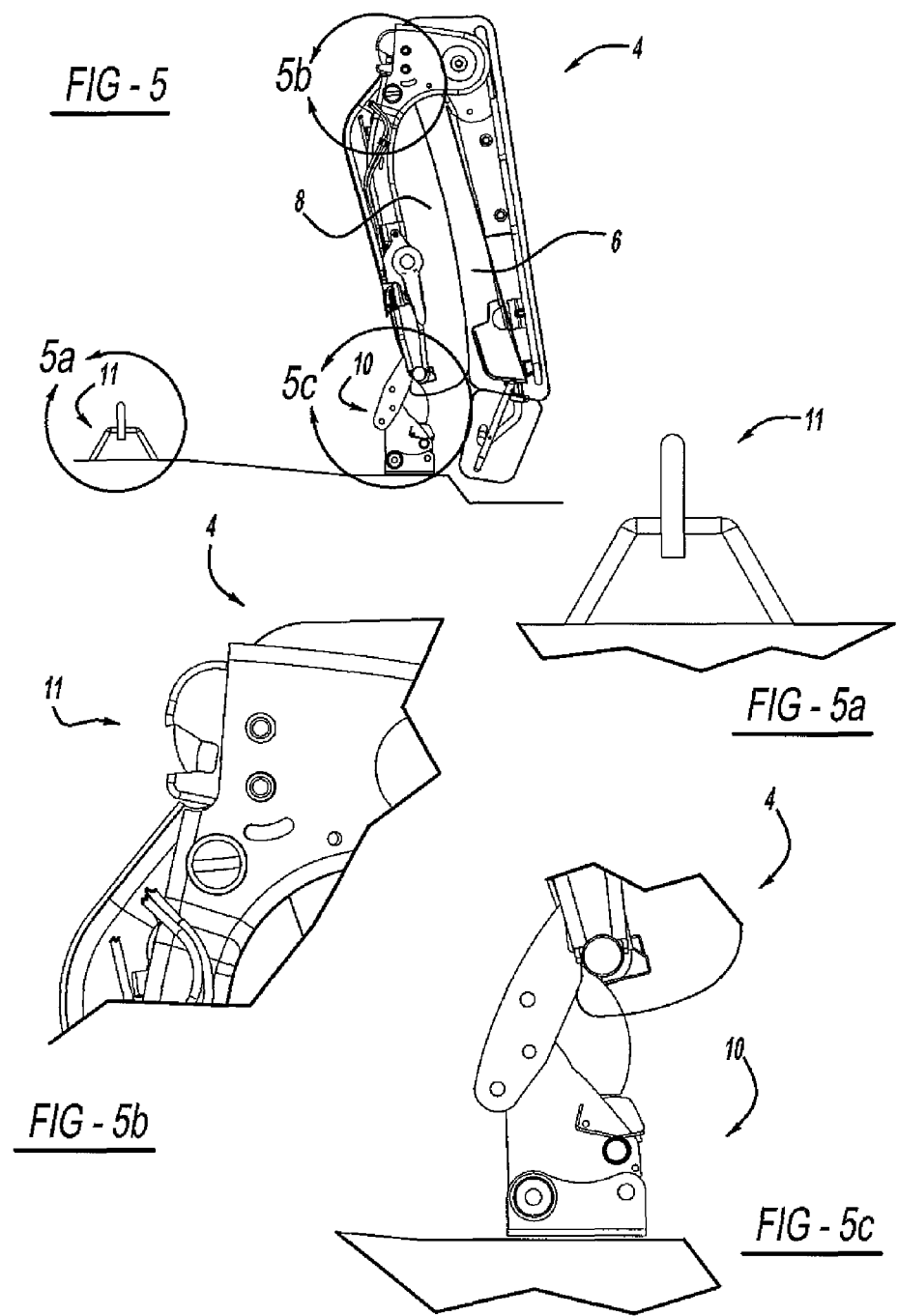

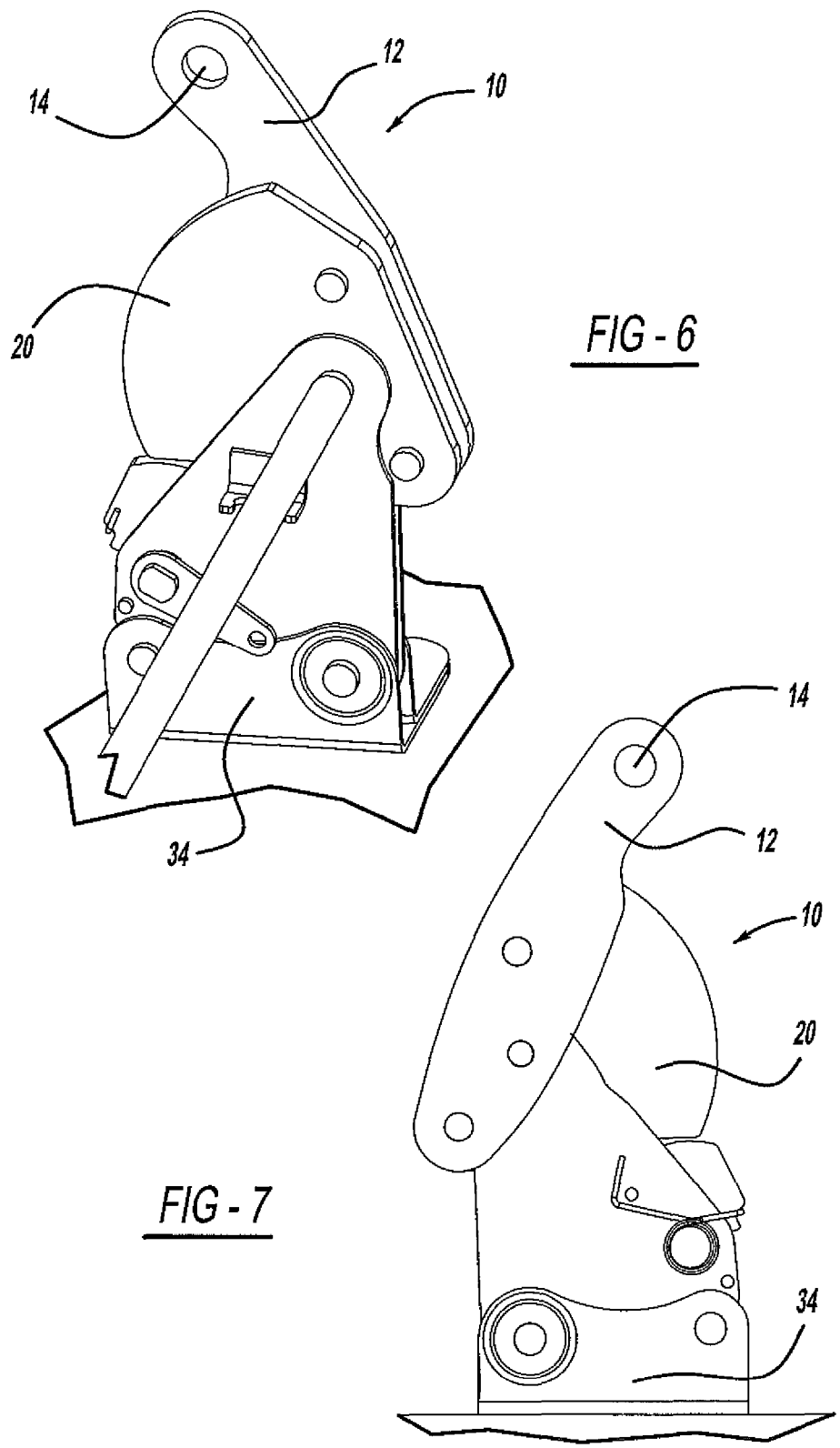

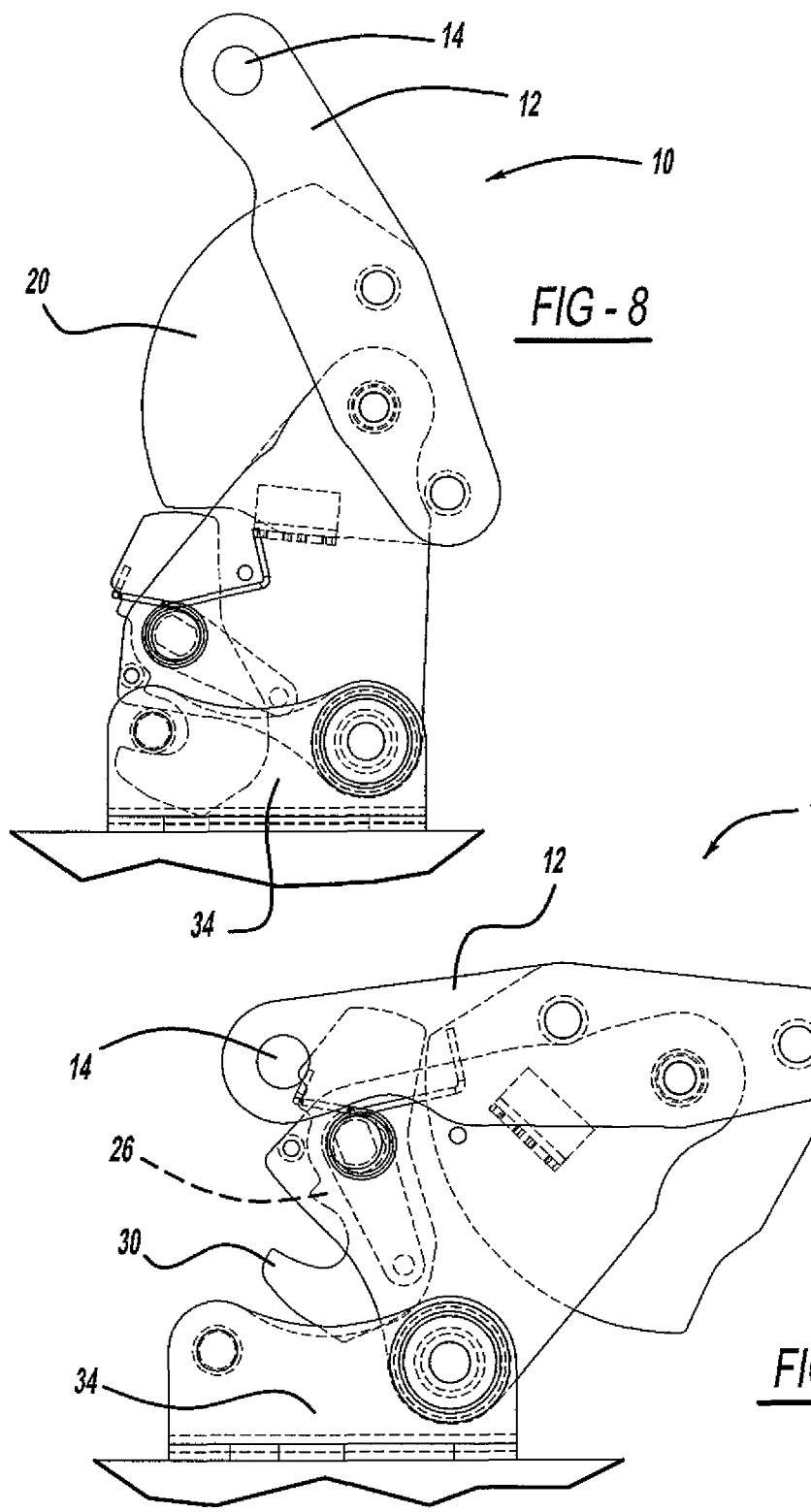

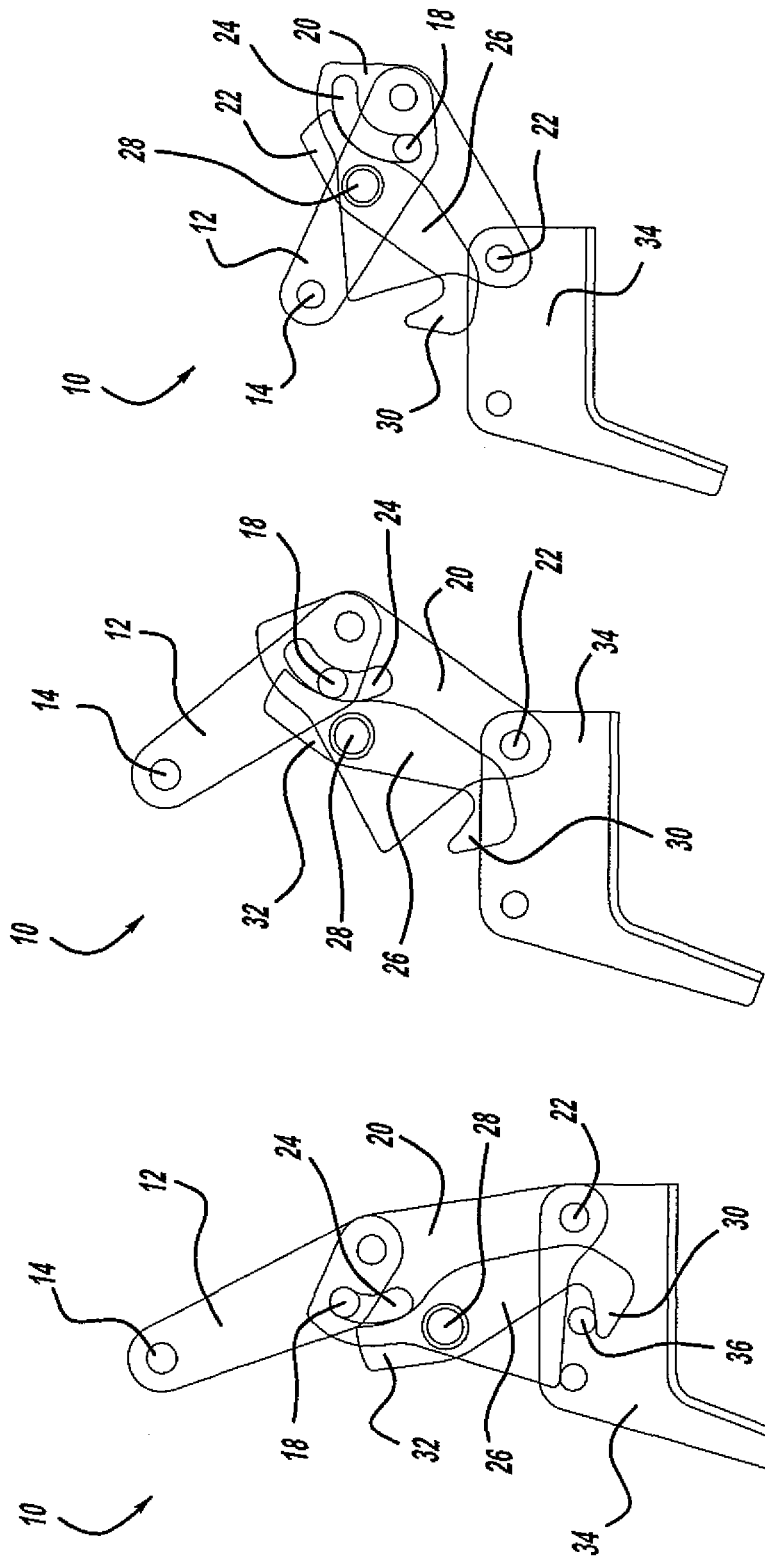

US 8,840,187 B2

PIVOT RETAINER

CROSS-REFERENCE TO RELATED APPLICATION

This application claims the benefit of U.S. Provisional Application No. 60/900,469, entitled FOLD AND TUMBLE SEAT, and filed Feb. 8, 2007, the content of which is incorporated herein by reference in its entirety.

BACKGROUND

The present disclosure, as currently understood, generally relates to the field of vehicle seats and in particular to vehicle seats that may be folded and their method of manufacture and construction.

It is generally known to provide a vehicle seat that can fold and stow, that can fold and tumble, and that can do both. There remains a continuing need to provide a vehicle seat with greater flexibility and adjustability. In particular, there remains a continuing need to provide a vehicle seat that can stow in a smaller space.

SUMMARY

In one exemplary embodiment, a fold, stow, and tumble seat assembly includes a latch mechanism having an upper link member pivotally coupled to both a seat base member and a lower link member. The lower link member is pivotally coupled to a base member or plate. The base member is fixed to a portion of a vehicle structure. A lever is pivotally coupled to the lower link member such that it retains the latch mechanism in an extended position. The lever may also be actuated such that the latch mechanism and the seat is moveable to a kneeled position.

The disclosure will become more fully understood from the following description, taken in conjunction with the accompanying drawings, in which.

Figure 2:
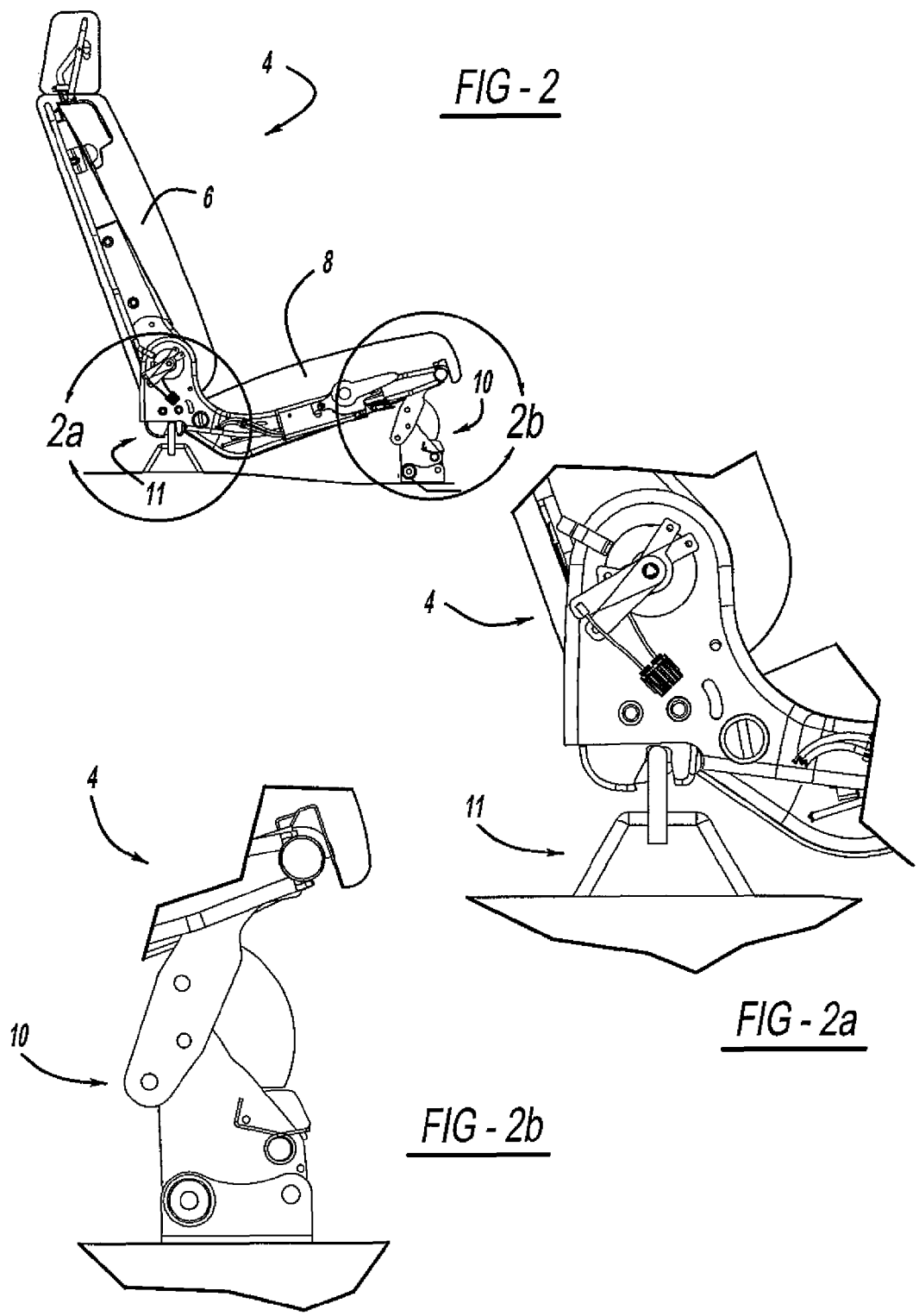
FIG. 2 shows a partial vehicle interior having a vehicle seat in an upright position according to an exemplary embodiment.
Figure 3:
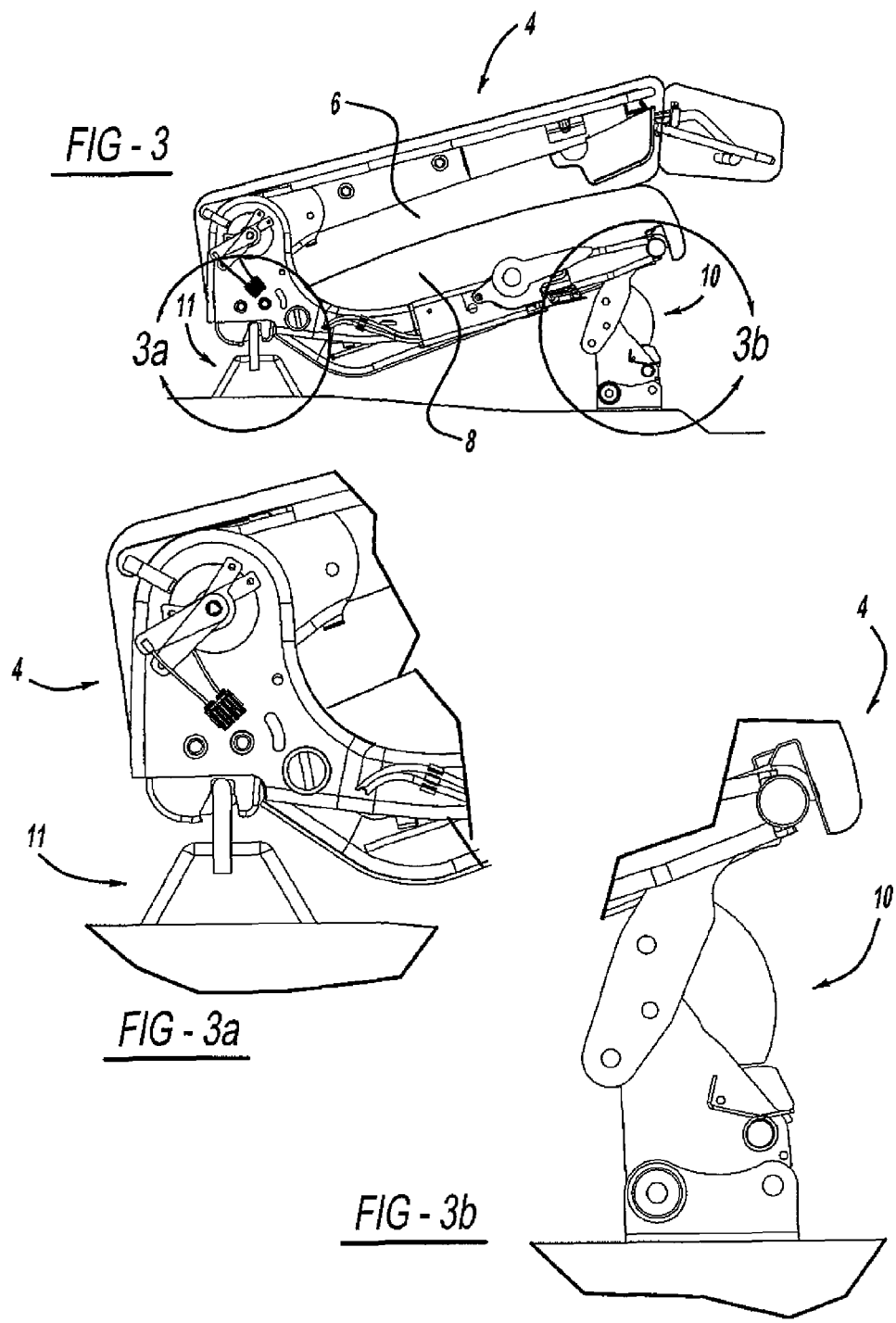
Figure 4:
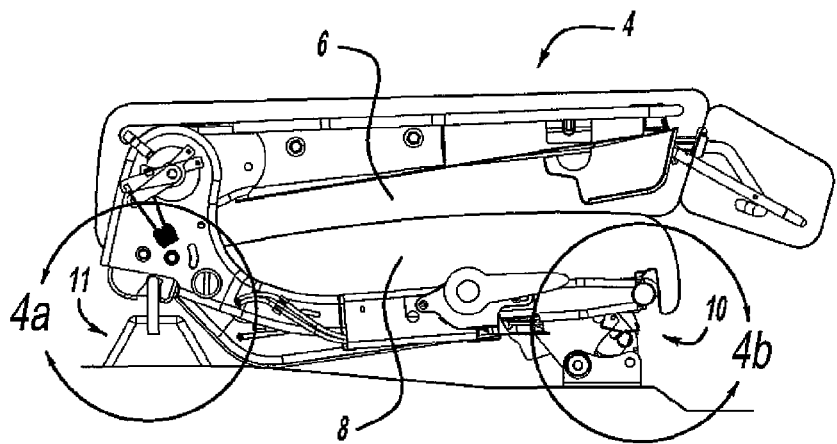
Figure 4A:
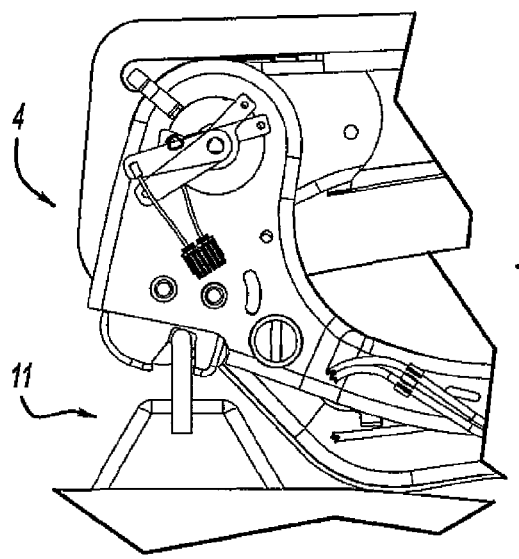
Figure 4B:
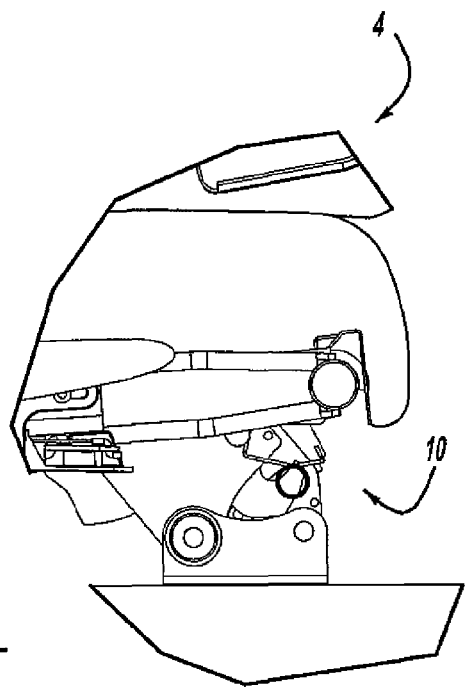

FIG. 2*a* shows an exploded view of the rear latch of FIG. 2 according to an exemplary embodiment;

FIG. 2*b* shows an exploded view of the latch mechanism of FIG. 2 according to an exemplary embodiment;

FIG. 3 shows the vehicle seat of FIG. 2 in a folded position according to an exemplary embodiment;

FIG. 3*a* shows an exploded view of the rear latch of FIG. 3 according to an exemplary embodiment;

FIG. 3*b* shows an exploded view of the latch mechanism of FIG. 3 according to an exemplary embodiment;

FIG. 4 shows the vehicle seat of FIG. 2 in a kneeled/stowed position according to an exemplary embodiment;

FIG. 4*a* shows an exploded view of the rear latch of FIG. 4 according to an exemplary embodiment;

FIG. 4*b* shows an exploded view of the latch mechanism of FIG. 4 according to an exemplary embodiment;

FIG. 5 shows the vehicle seat of FIG. 2 in a folded and tumbled position according to an exemplary embodiment;

FIG. 5*a* shows an exploded view of the rear latch of FIG. 5 according to an exemplary embodiment;

FIG. 5*b* shows an exploded view of the rear latch of FIG. 5 according to an exemplary embodiment;

FIG. 5*c* shows an exploded view of the latch mechanism of FIG. 5 according to an exemplary embodiment;

FIG. 6 shows a support leg having a latch mechanism for a vehicle seat according to an exemplary embodiment;

FIGS. 7 and 8 show opposite side views of the support leg and latch mechanism of FIG. 6.

Figure 10:
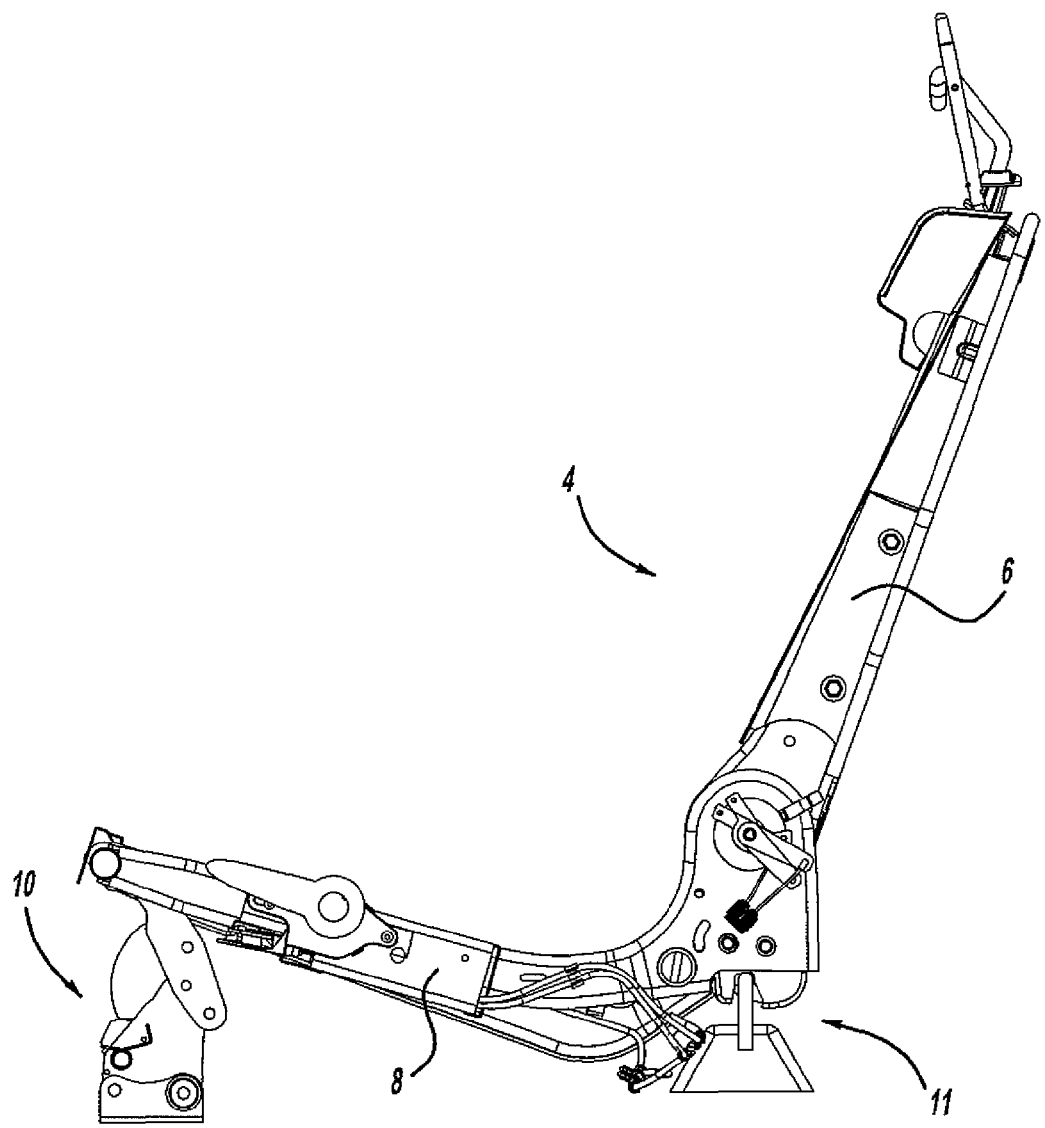
Figure 11:
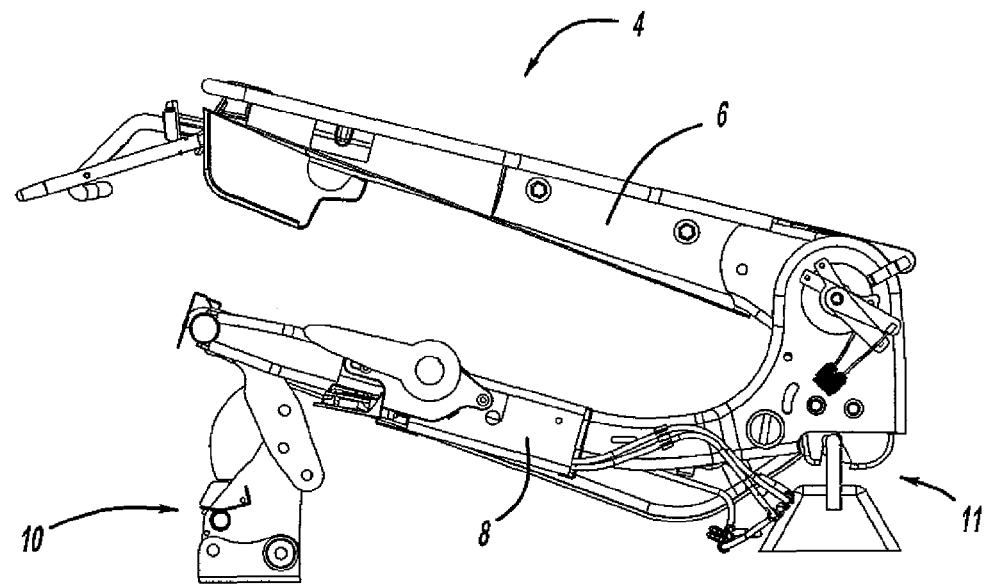
Figure 12:
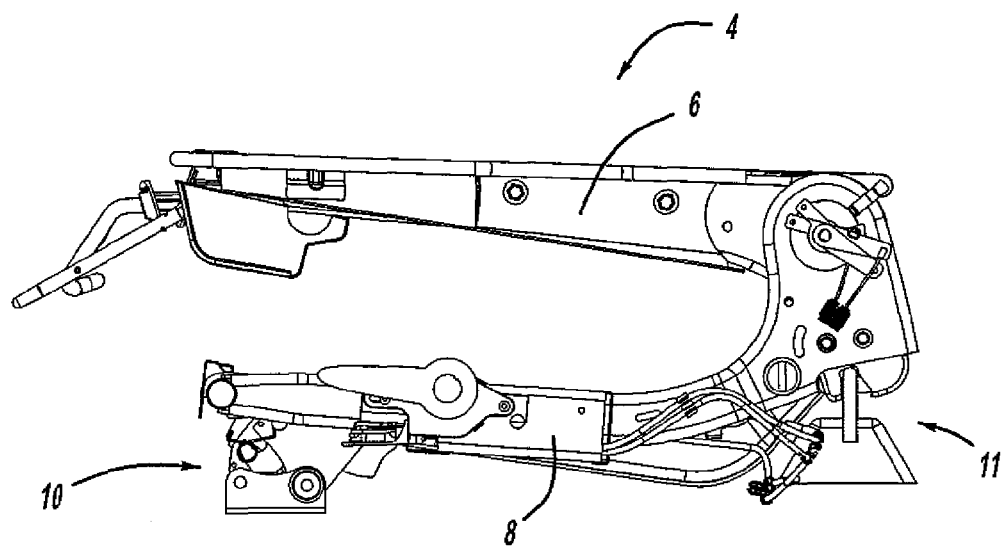
Figure 13:
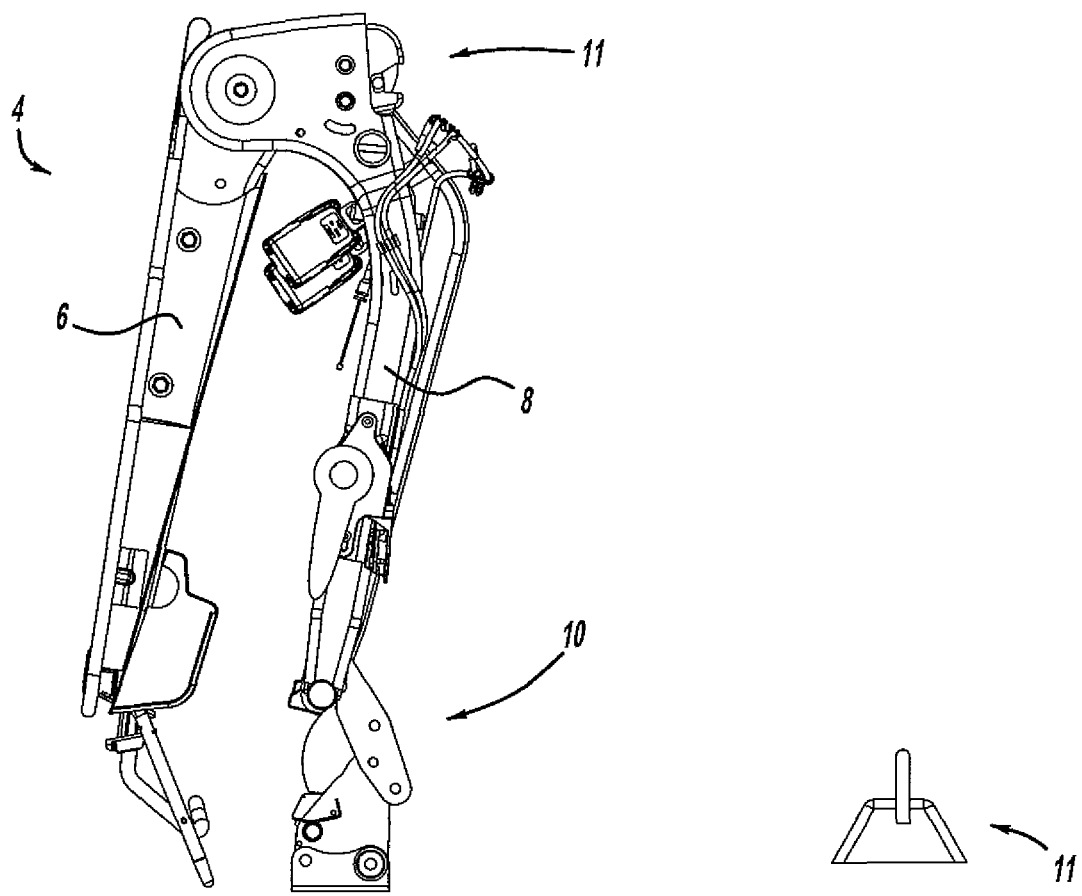

FIG. 9 shows a latch mechanism according to an exemplary embodiment;

FIGS. 10-12 show the latch mechanism of FIG. 9 in various positions according to various exemplary embodiments;

FIG. 13 shows a vehicle seat in an upright position according to an exemplary embodiment;

FIGS. 14-17 show the components of the latch mechanism of FIGS. 2-13 according to an exemplary embodiment.

DETAILED DESCRIPTION

Figure 1:
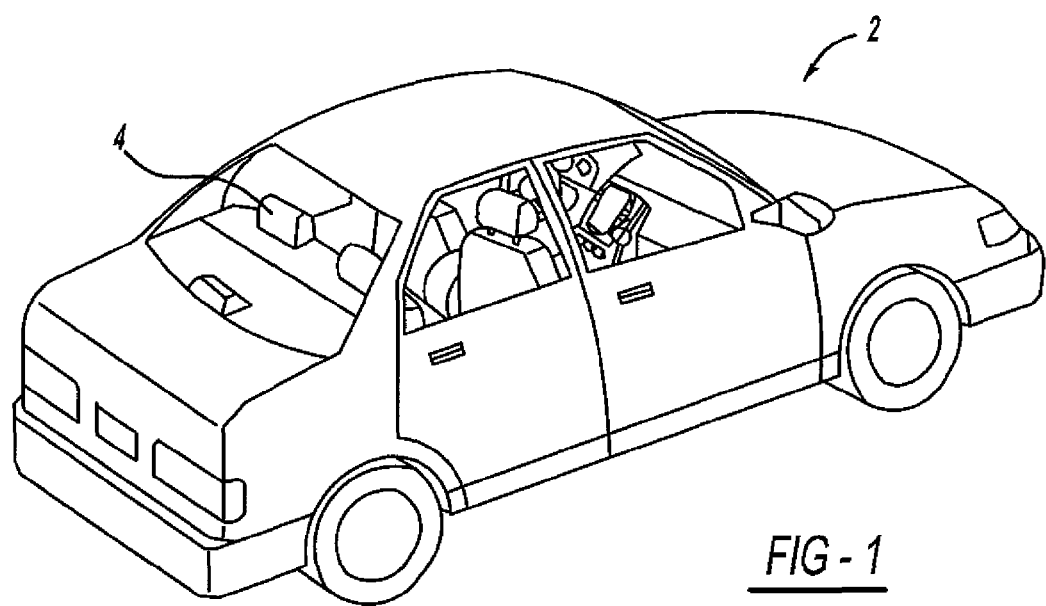
FIG. 1 shows a vehicle according to an exemplary embodiment.

Referring generally to the FIGURES and in particular to FIG. 1, a vehicle (2) is shown with a seat assembly (4) according to an exemplary embodiment. While the vehicle (2) is shown as a four-door sedan, it should be understood that the seat assembly (4) may be used in a variety of vehicles, including mini-vans, sport utility vehicles, as well in any other type of vehicle or in other seating applications. Further, the support leg (6) and latch mechanism (8) described herein may be used in combination with a variety of types and configurations of seat assemblies, frames, structures, etc. One exemplary embodiment of a modular seat structure is described in U.S. Provisional Patent Application No. 60/859,415, filed Nov. 16, 2006, which is incorporated herein by reference in its entirety.

Referring now to FIGS. 2-6, the seat assembly (4) includes a seat back (6) and a seat base (8). The seat assembly (4) is attached to, for example, the floor structure of the vehicle (2) by a latch mechanism (10) below the front portion of the seat base (8) and a rear latch (11) below the rear of the seat base (8). Referring to FIG. 3, the seat back (6) is pivotally coupled to the seat base (8) such that the seat back (6) may be rotated forward, toward the seat base (8), to a folded position (shown in FIG. 3). According to one embodiment, the latch mechanism (10) is configured such that from the folded position, the seat (4) may further be positioned into a kneeled or stow position (shown in FIG. 4), such that the rear surface of the seat back (4) is in an essentially horizontal orientation, or to a tumbled position (shown in FIG. 5) such that the folded seat (4) is rotated about the latch mechanism (10) to a generally vertical position. As shown in FIG. 5, in the tumbled position, the seat (4) may be rotated forward such that it is adjacent a seat in the next row forward (e.g., in the case of a rear seat being tumbled toward a front-row seat). The positioning of the seat assembly (4) into the various positions is facilitated by the configuration and operation of the latch mechanism (10), which will now be described in greater detail.

Referring to FIG. 6, a latch mechanism (10) is shown according to an exemplary embodiment. The latch mechanism (10) includes an upper link (12) that may be a shaped generally plate member having a seat pivot (14), an upper link pivot (16), and an upper pin (18). The upper pin (18) is a generally cylindrical member that may be secured to the upper link (12) using any suitable means known to those skilled in the art. The upper link (12) is pivotally coupled to the lower front portion of the seat base (8) (not shown in FIG. 6) at the seat pivot point (14). A lower link (20) is pivotally coupled to the upper link (12) at an upper link pivot (16). The lower link pivot (22) includes a slot (24) (best shown in FIG. 9) within which the upper pin (18) travels, thereby limiting the range of rotation of the upper link (12) relative to the lower link (20). A lever (26) is pivotally coupled to the lower link (20) at a lever pivot (28). The lever (26) includes a hook portion (30) and a cam portion (32), described in further detail below.

The lower link (20) is pivotally coupled to a base member (34) at a lower link pivot (22). Rotation of the lower link pivot (22) is limited by a stop pin (36) in the base member (34). The base member (34) is configured to be secured to a floor portion of a vehicle (2) and may include a variety of configurations. For example, as best shown in the FIGS. 6-12, the base member (34) is an angled plate member configured to conform to a corresponding angled portion of a vehicle floor. It should be understood that the various pivotal joints used in the latch mechanism (10) may comprise any suitable pivot mechanisms capable of permitting pivoting of the various components of the latch mechanism (10) as described herein.

As shown in FIGS. 6-10, the latch mechanism (10) is in an extended position such that the seat base (8) is supported in a design, or upright position (see FIG. 2). In this position, the stop pin (36) is configured to engage a hook portion (30) of the lever (26) (e.g., catch, hook, etc.), thereby preventing rotation of the lower link (20) in the counter clockwise direction (as shown in FIG. 6). Rotation of the lower link (20) in the clockwise direction (as shown in FIG. 6) is constrained by a lower portion of the lower link (20) engaging the stop pin (36). In this position, the lower link (20) is unable to rotate and is fixed in position. The lever (26) further includes a cam portion (32) that engages the upper pin (18) when the hook portion (30) of the lever (26) engages the stop pin (36). In this configuration, the upper link (12) is prevented from rotating clockwise (as shown in FIG. 6). With both the upper link (12) and the lower link (20) positioned as shown in FIG. 6, the latch mechanism (10) provides a stable support for the seat base (8). According to one embodiment, the lever (26) may be biased such that the hook portion (30) tends to rotate toward the stop pin (36).

Referring back to FIG. 3, the seat back (6) may be rotated forward such that the seat assembly (4) is in the folded position. In this position, the latch mechanism (10) may continue to support the seat base (8) in the extended position as described with respect to FIG. 6. According to an alternative embodiment, shown in FIG. 4, the seat (4) may be further moved to a kneeled or stow position, by moving the latch mechanism (10) to a kneeled position (see FIG. 12). Referring to FIGS. 10-12, to move the latch mechanism (10) to a kneeled position, a user actuates the mechanism (10) to rotate the lever (26) such that the hook portion (30) rotates away from the stop pin (36) (e.g., counter-clockwise as shown in FIG. 10). The lever (26) may be actuated in a variety of ways, including coupling one end of the lever (26) to a handle of the other actuation means via a control cable or any other suitable means. The actuation means may be located at any suitable location. For example, the actuation means may be located beneath the rear portion of the seat base (8), so as to be easily accessible from the rear of the seat (4).

Rotation of the lever (26) such that the hook portion (30) rotates away from the stop pin (36) also causes the cam portion (32) to rotate such that the upper pin (18) is moveable downward with the slot (24) in the lower link (20), thereby freeing the upper link (12) and the lower link (20) to rotate. As shown in FIGS. 10-12, the cam portion (32) of the lever (26) has a contoured surface that enables the upper pin (18) to ride along the lever (26) as the latch mechanism (10) is moved from an extended position to a kneeled position. Rotation of the upper link (16) and the lower link (20) is a result of the seat assembly (4) rotating about the rear latch point (11) (see FIGS. 3 and 4). As the seat assembly (4) is rotated about the rear latch (11), the upper link (12) and the lower link (20) both then rotate such that the upper link (12) rotates about the upper link pivot (16) (counterclockwise in FIGS. 10-12) and the lower link (20) rotates about the lower link pivot (22) (clockwise in FIGS. 10-12) until the latch mechanism (10) reaches the kneeled position shown in FIG. 12.

According to one embodiment, movement of the seat assembly (4) from the folded position to the kneeled or stow position is accomplished by actuating the lever (26) and allowing the seat assembly (4) to rotate about the rear latch (11) as a result of its own weight or against a biasing mechanism or spring. Returning the seat assembly (4) to the folded position is then accomplished by a user rotating the seat assembly (4) back about the rear latch (11) until the lever (26) is positioned such that the cam portion (32) again engages the upper pin (18) and the hook portion (30) engages the stop pin (36). According to various alternative embodiments, one or more assist springs may be provided (not shown) to assist a user in returning the seat assembly (4) to a seating position.

Referring back to FIGS. 3 and 4, it should be understood that the latch mechanism (10) enables a user to further stow a seat (4) from a folded position (shown in FIG. 3), where the rear surface of the seat back (6) is still at an incline relative to horizontal, to the kneeled or stow position (shown in FIG. 4), where the rear surface of the seat back (6) is essentially parallel relative to horizontal. This feature may provide advantages in creating a larger and more usable space within the vehicle interior.

Figure 14:
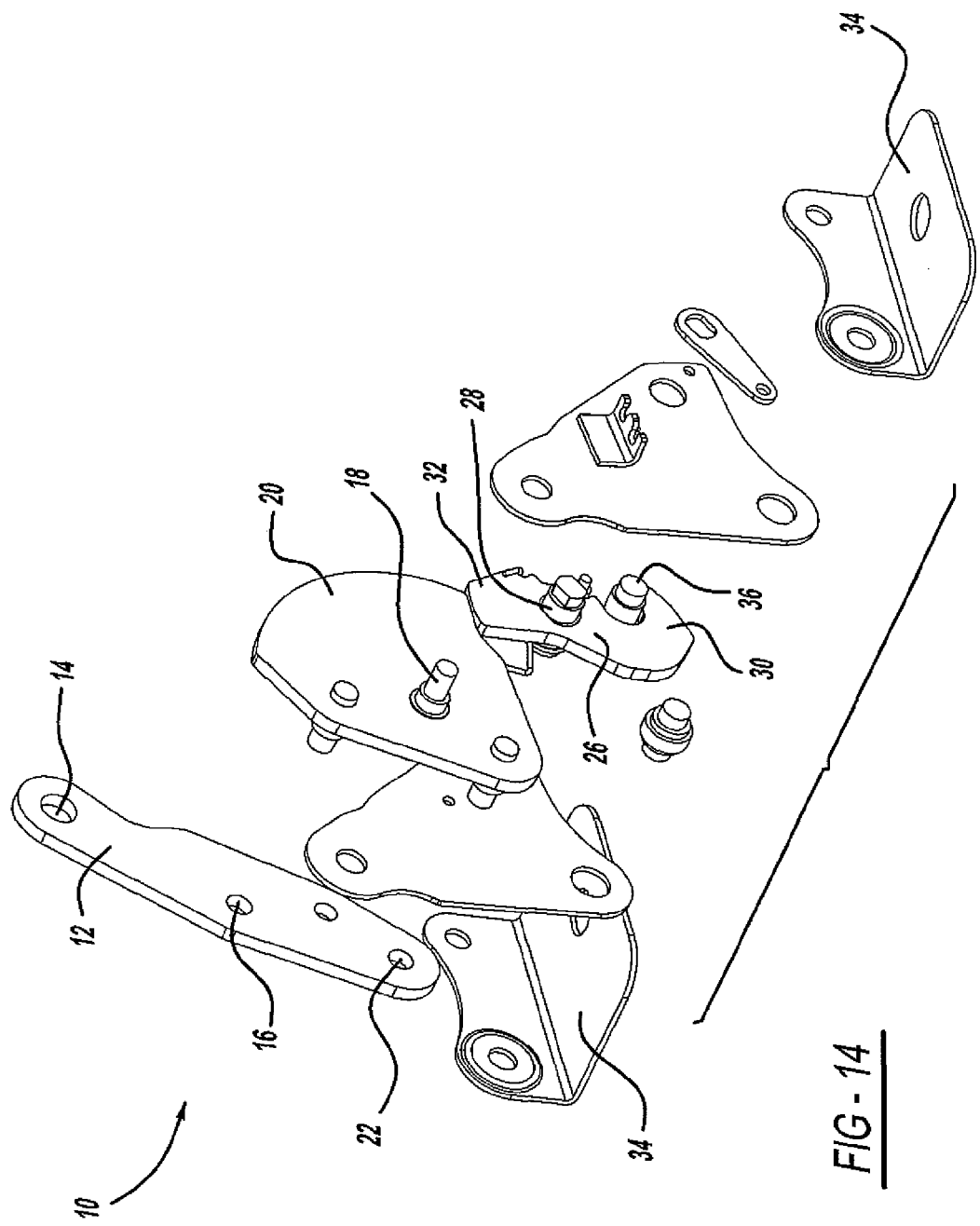

Referring now to FIGS. 3, 5, 14, and 16, positioning of the seat assembly (4) into the tumble position will be described in greater detail. As shown in FIGS. 3 and 14, the seat assembly (4) may be positioned in a folded position, where the latch mechanism (10) remains extended beneath the front portion of the seat base (8). As discussed with respect to FIGS. 10-12, a user may choose to then move the seat (4) to a kneeled or stow position. Alternatively, the user may choose to move the seat assembly (4) to a tumbled position, shown in FIGS. 5 and 16. In order to accomplish movement of the seat assembly (4) from the folded position to the tumbled position, a user releases the rear latch (11) such that the rear portion of the seat assembly (4) is no longer restrained by the rear latch (11). Any suitable means known to those skilled in the art may be used to provide for release of the rear latch (11). Upon release of the rear latch (11) the seat assembly (4) is rotated forward about the latch mechanism (10) to a generally upright position (see, e.g., FIG. 16). During rotation of the seat assembly (4), the seat assembly (4) rotates about the seat pivot point (14) of the upper link (12), and the latch mechanism (10) remains in the extended position.

In order to return the seat assembly (4) to the seating or upright position from the tumbled position, a user rotates the seat assembly (4) back about the upper link pivot point (16) until the rear latch (11) again engages the rear portion of the seat base (8). The seat back (6) may then be rotated back from the folded position to an upright, or seating/design, position.

It should be understood that one or more latch mechanisms (10) described may be used with a single seat assembly (4), and the positioning of the latch mechanism (10) as shown in the FIGURES may be varied to suit a particular application or seat structure (e.g., variations in seat or vehicle construction). Further, the components of the latch mechanism (10) may be made from any suitable materials and using any suitable manufacturing and assembly methods known to those skilled in the art.

It is important to note that the construction and arrangement of the component and method of making the component as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements the position of elements may be reversed or otherwise varied and the nature or number of discrete elements or positions may be altered or varied. Accordingly, all such modifications are intended to be included within the scope of the present invention. The order or sequence of any process or method steps may be varied or resequenced according to alternative embodiments. Other substitutions, modifications, changes, and omissions maybe made in the design, operating conditions, and arrangement of the exemplary embodiments.

What is claimed is:

1. A reconfigurable seat assembly reconfigurable into design, fold, stow, or tumble configurations, the seat assembly comprising:
    a seat back and a seat base, wherein the seat back is pivotally coupled for rotation thereby permitting the seat back to be rotated forward, toward the seat base,
    a support structure adapted to support the seat base, the support structure including a first latch mechanism having a first link and a second link pivotable on the first link, and the first latch mechanism adapted to operate with the support structure to reconfigure the seat assembly into various positions, wherein the first link member is pivotally connected directly to the seat base and is pivotally connected directly to the second link member, and the second link member is pivotally connected to a base member fixed to a portion of a vehicle structure; and
    a second latch mechanism operable with the seat base and adapted to anchor and facilitate reconfiguration of the seat assembly into various positions;
    wherein the first latch mechanism may be configured to position the seat assembly into the stow configuration such that the rear surface of the seat back is in a substantially horizontal orientation and into the tumble configuration wherein the folded seat assembly is rotated about the first latch mechanism to a generally vertically-aligned position.

2. The reconfigurable seat assembly according to claim 1 wherein the first latch mechanism is located proximal a front portion of the seat base and the second latch mechanism is located proximal a rear portion of the seat base.

3. The reconfigurable seat assembly according to claim 1 further comprising a recliner mechanism for coupling the seat back to the seat base for selectively rotating the seat back toward the seat base and to the folded configuration.

4. A latch mechanism for use in a reconfigurable seat assembly including a seat base and seat back reconfigurable to stow, the latch mechanism comprising:
    a first link pivotally connected directly to the seat base;
    a second link pivotally connected directly to both the first link and a base member fixed to a portion of a vehicle structure,
    wherein the first latch mechanism includes an upper pin secured to the first link, and the upper pin is a generally cylindrical member projecting from a side of the first link, further comprising a slot within which the upper pin travels, thereby limiting a range of rotation of the first link relative to the second link, further comprising a lever pivotally coupled to the second link, wherein the lever includes a hook portion adapted to engage a striker and a cam portion adapted to engage a pin when the hook portion of the lever engages the striker.

5. The latch mechanism according to claim 4 wherein the first link is pivotally coupled to a lower front portion of the seat base.

* * * * *